Dec. 22, 1936.  F. A. JACKLITCH  2,065,073
TRANSMISSION MECHANISM
Filed Feb. 23, 1935  4 Sheets-Sheet 1
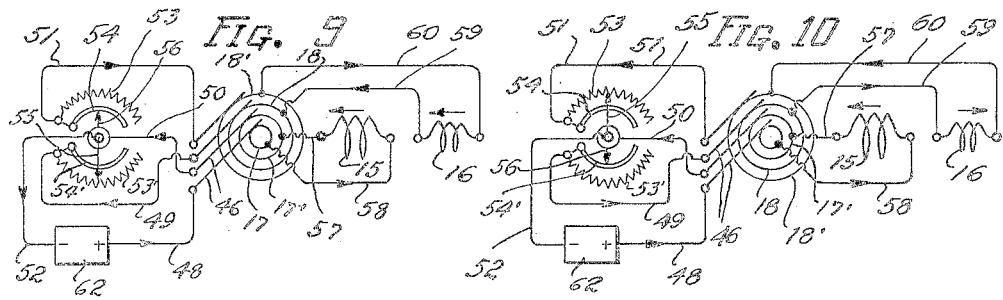
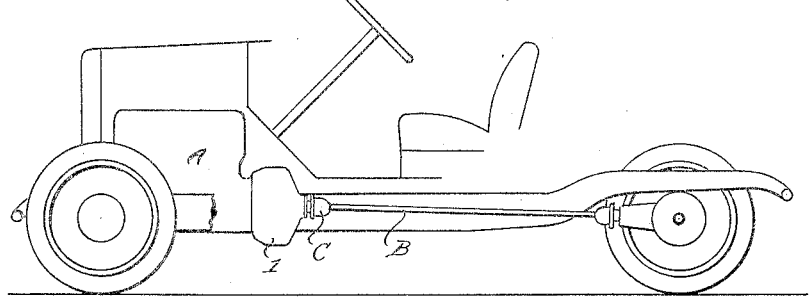
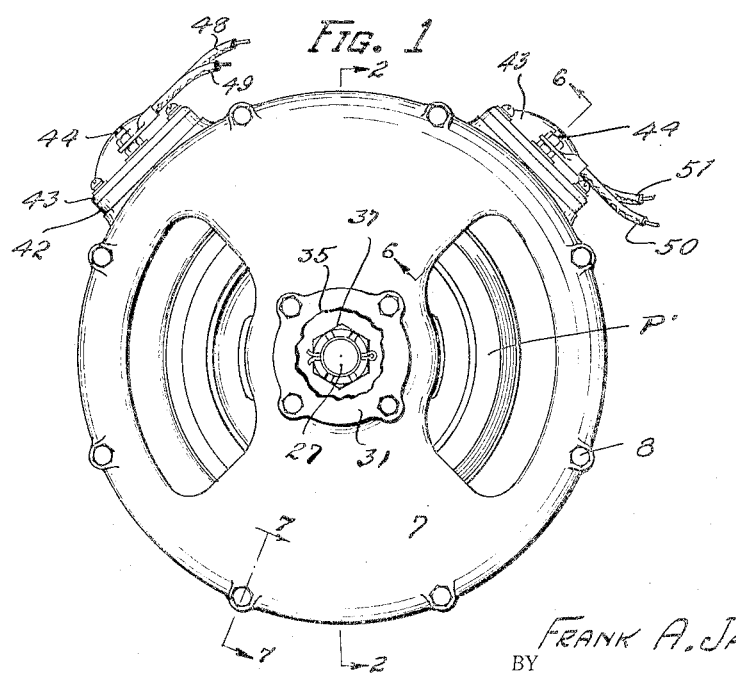
INVENTOR.
FRANK A. JACKLITCH
BY Bates, Goldrick & Teare
ATTORNEYS.

Dec. 22, 1936.  F. A. JACKLITCH  2,065,073
TRANSMISSION MECHANISM
Filed Feb. 23, 1935  4 Sheets—Sheet 2
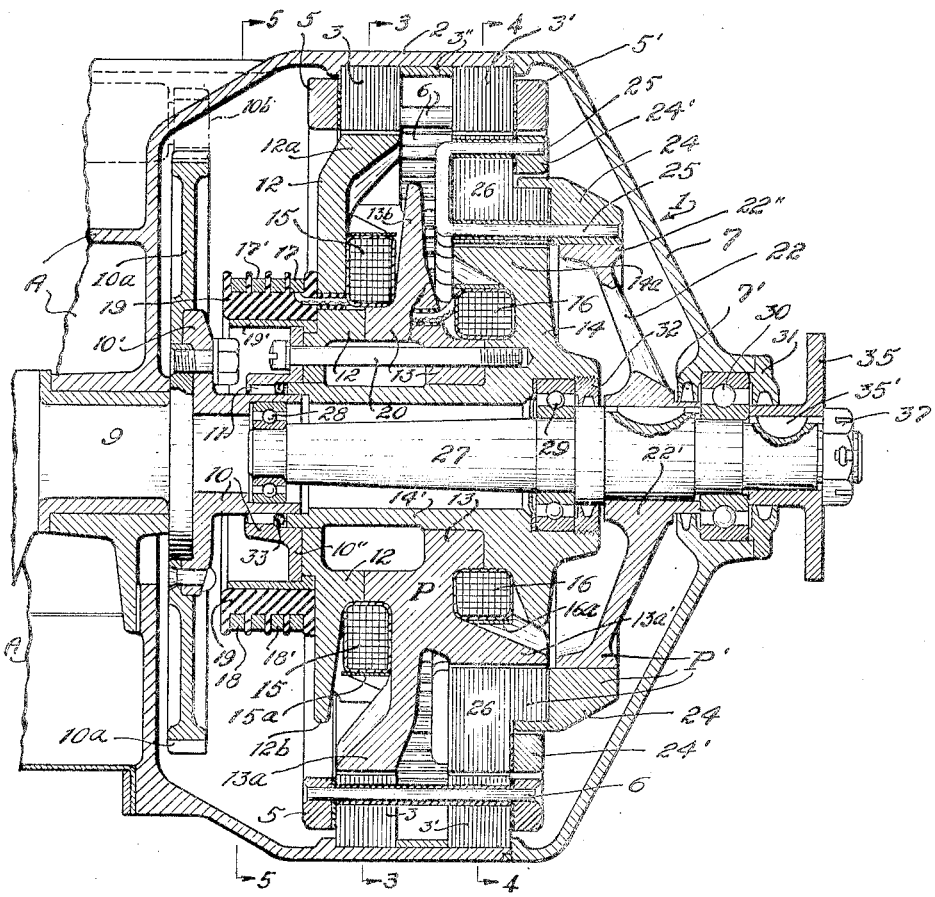
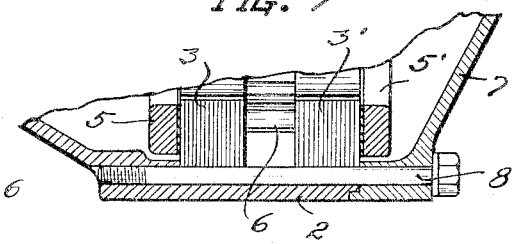
INVENTOR.
FRANK A. JACKLITCH
BY Bates, Golrick & Teare
ATTORNEYS.

Dec. 22, 1936.　　　F. A. JACKLITCH　　　2,065,073
TRANSMISSION MECHANISM
Filed Feb. 23, 1935　　　4 Sheets-Sheet 3

INVENTOR.
FRANK A. JACKLITCH
BY
Bates, Golrick & Teare
ATTORNEYS.

Dec. 22, 1936.  F. A. JACKLITCH  2,065,073
TRANSMISSION MECHANISM
Filed Feb. 23, 1935   4 Sheets-Sheet 4

INVENTOR.
FRANK A. JACKLITCH
BY
Bates, Goldsick & Teare
ATTORNEYS.

Patented Dec. 22, 1936

2,065,073

UNITED STATES PATENT OFFICE 2,065,073

TRANSMISSION MECHANISM

Frank A. Jacklitch, Lakewood, Ohio, assignor to Milton W. Kleckner, trustee

Application February 23, 1935, Serial No. 7,732

5 Claims. (Cl. 172—239)

This invention relates to a transmission mechanism, particularly adapted to serve in place of conventional change speed transmissions of internal combustion motor-driven vehicles to secure the necessary propeller shaft drive at variable speeds. The principal object is to provide a new and improved electro-magnetic transmission for connecting two shafts, e. g. so that the speed and direction of one shaft may be varied, as desired, with relation to the speed and direction of the other.

Another object is to provide an electric coupling adapted for connecting relatively rotating elements in various speed relationships, and which will operate efficiently to transmit power at high torque during relatively low speed conditions of the driven element and at low torque during high speeds of such element.

A further object is to provide an electro-magnetic transmission in which the necessary parts are easy to manufacture and assemble, and with which the various speeds may be secured by means of simple and substantially conventional electric control apparatus.

A further object is to provide an electro-magnetic transmission mechanism which will obviate the necessity for a fly-wheel, clutch and change speed transmission gearing, including the reversing gear, from the power connections between the motor and driving axle of an internal combustion motor-driven vehicle.

Another object is to provide an electro-magnetic coupling or transmission which will obviate the necessity for using mechanical braking devices for slowing down the vehicle;—at least for emergency braking.

Further objects and features of the invention will become apparent from the following description, relating to the accompanying drawings, showing the preferred form. The essential characteristics are summarized in the claims.

Figure 3:
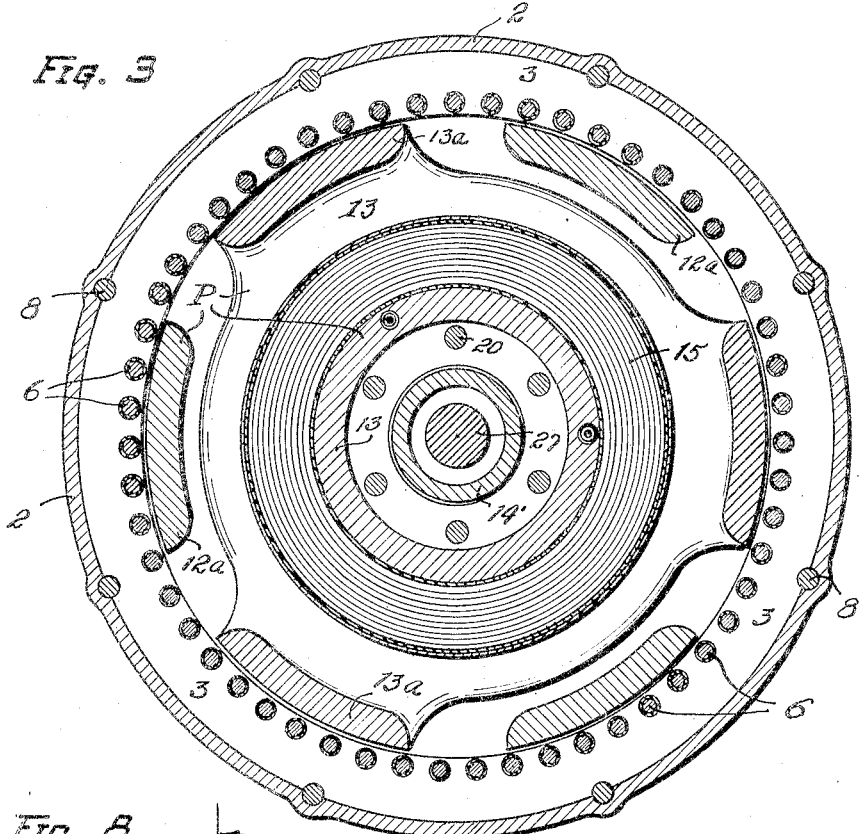
Figure 8:
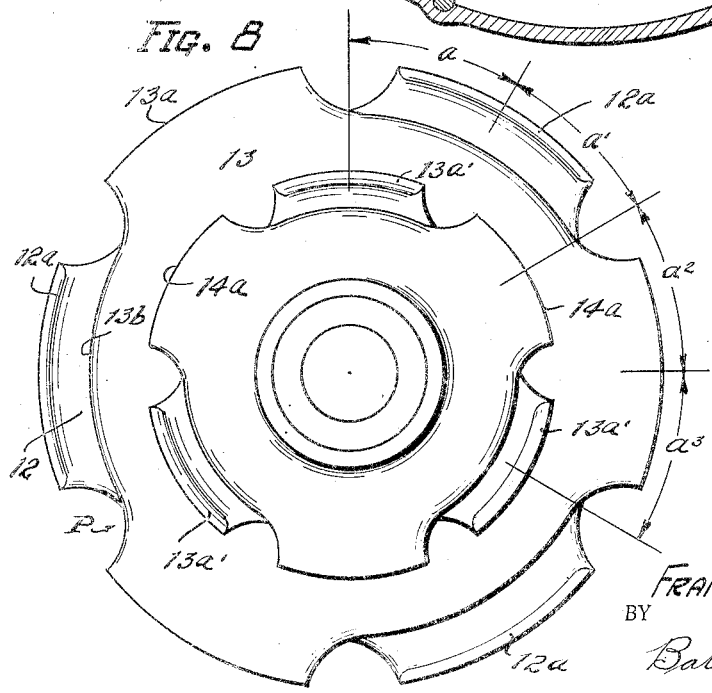
Figure 4:
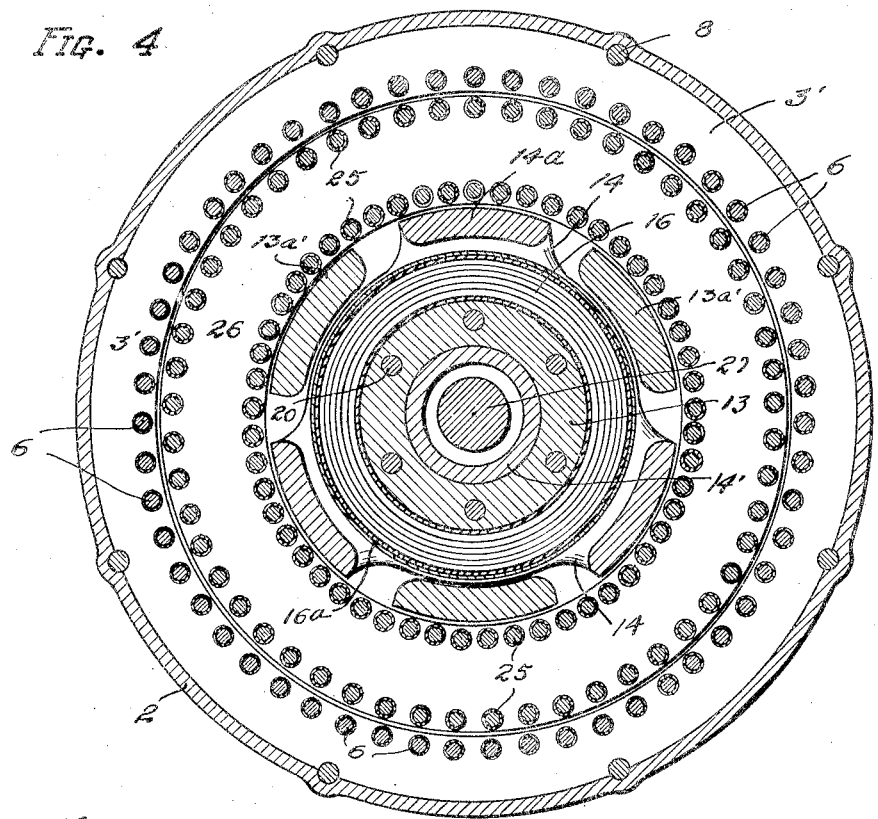
Figure 5:
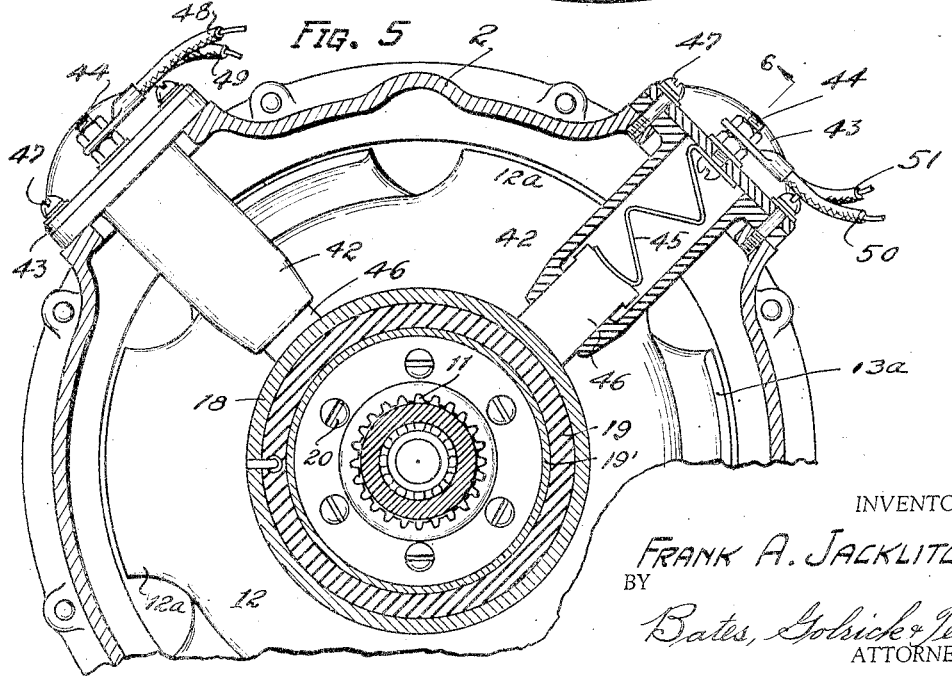

In the drawings, Fig. 1 is an end elevation of the transmission unit viewed from the driven or tail-shaft end; Fig. 2 is a longitudinal central section, taken substantially along the line 2—2 on Fig. 1; Figs. 3, 4, and 5 are transverse sectional views, taken substantially along the lines 3—3, 4—4, and 5—5, respectively, on Fig. 2; Figs. 6 and 7 are fragmentary sectional detail views, as indicated by the lines 6—6 and 7—7 on Fig. 1; Fig. 8 is an axial or end view of the driving or primary rotor showing the angular relationship of the magnetic poles thereof; Figs. 9 and 10 are electric diagrams showing a suitable control for the unit; Fig. 11 is a partially diagrammatic view, showing one manner in which the present unit may be incorporated in the power line of a motor vehicle.

At the outset, it may be stated that the mechanism consists of one electro-magnetic element or unit, mechanically connected to the impeller of a suitable engine or propulsion means, and a second electro-magnetic element or unit preferably mechanically disassociated from the first, but adapted to be mechanically connected to an element to be driven, such as the propeller shaft of an automobile. These elements are controlled electrically, partly automatically in response to the torque requirements, to effect the necessary driving speeds.

As an example of one use for the invention, reference is directed to Fig. 11, wherein A indicates a suitable internal combustion motor at the driving end of which is connected an embodiment 1 of the present unit. The driven element of the unit 1 is connected to the propeller shaft B, as by a universal joint C, and the propeller shaft drives the vehicle in the usual fashion.

Referring to Figs. 2 to 7, inclusive, (first to Fig. 2) the rear end of the internal combustion motor frame casting terminates in a circular bell housing 2 which may, for example, comprise the principal part of the casing of the present unit. The bell housing forms a rigid field frame supporting, in suitable machined surfaces, stator elements 3 and 3' (laminated circular rings, as shown) spaced as by means of a sleeve 3" and held in assembled relationship by annular conductor rings 5 and 5' which form the short circuit connections of a "squirrel cage" including conductor bar elements 6 passing through aligned insulated parallel openings in the stator elements, and into aligned openings of the rings 5 and 5', as shown at the lower portion of Fig. 2.

The squirrel cage assembly, just described, is held in fixed position, and the housing for the unit completed, by a generally conical end plate 7. The end plate abuts the stator element 3' and forms a rabbet joint with the rim of the housing 2. The casing parts 2 and 7 (see Figs. 1 and 7) may be secured together as by bolts 8. The end plate, centrally thereof, supports the final driven element or tail-shaft of the transmission in a manner to be later described.

The flanged rear end of the prime mover (engine shaft 9 in the present embodiment) is connected as by means of a suitable series of screws with a two-part double flanged sleeve or collar 10, (parts splined together at 11), having flanges 10 and 10'', the collar forming the driving coupling between the engine shaft and the primary or driving rotor P of the transmission, to be presently described.

A suitable ring gear 10a for a conventional starter mechanism may be mounted on the flange 10', as by suitable rivets, the position of the cooperating starting pinion being indicated by broken lines in active position at 10b.

The driving rotor P comprises, as shown, three magnet elements, 12, 13, and 14 (iron castings, e. g.) secured together as by screws 20 (Figs. 2 and 3) to form a rigid unit, mounted to rotate with the shaft 9, the unit being supported on suitable bearings, to be hereinafter described. The elements 12 and 13 have central bores fitting a forwardly extending tubular central portion 14' of the element 14, whereby the magnet elements are maintained in alignment. The screws 20 also pass through the flange 10'' of the coupling sleeve 10, as shown in Fig. 2, to drivingly secure the driving rotor unit to the engine shaft 9.

The detailed construction of the magnet elements is apparent from Figs. 2, 3, 4, and 8, wherein it may be noted that the magnet element 12 has circumferentially spaced radially extending and rearwardly inclined head formations or poles at 12a in the radial zone of the stator laminae 3 and the magnet element 13 has similarly spaced and shaped radially extending but forwardly inclined head formations or poles 13a, lying in the same plane as the poles 12a. Thus, the stator 3 is constantly in the zone of influence of the magnet elements 12 and 13 spaced therefrom by the usual slight gap. The elements 12 and 13 have radially extending flange formations 12b and 13b, forming webs between adjacent poles of the respective elements, the poles and webs and abutting annular base portions forming winding receiving and supporting channels for the winding or coil indicated at 15, the termini of which connect with suitable collector rings 17 and 17' supported on an insulating ring or hub 19—19' suitably secured to the forward face of the magnet element 12. The hub portion 19 also supports collector rings 18 and 18' for additional windings 16 of the primary rotor P, which, together with the brushes cooperating with the collector rings, will be presently described.

The central magnet element 13 of the primary rotor, in addition to the radial poles previously described, has rearwardly extending pole formations at 13a', lying in the transverse plane of the stator laminae 3', but not directly magnetically associated therewith since these poles are spaced materially inwardly from the stator part 3'. The rearmost magnet element 14 has similar radially and forwardly extending poles 14a lying in the same plane with the poles 13a', the two sets of poles being provided with the winding coil 16, previously mentioned contained in a channel formation between the elements 13 and 14, similar to that for the coil 15. The angular relationship of the various pole portions of the magnet elements are best illustrated in Fig. 8, showing the whole magnet assembly in rear end elevation. The radial axes of the poles 12a and 13a are spaced actually 60° apart, as indicated at $a'—a^2$ on Fig. 8, and the radial axes of the poles 13a' and 14a lie midway between each pole couple 12a, 13a, spaced according to $a—a'$ and $a^2—a^3$, Fig. 8, also 60° apart. This results in a magnetic spacing of 90 magnetic degrees, as will be explained in connection with the operation of the machine.

The termini of the coils 15 and 16 are secured to the respective collector rings 17, 17' (for 15) and 18 and 18' (for 16), the termini being drawn through suitable insulated bores in the respective magnet elements 12 and 13, as suggested in Fig. 2, and appropriately fastened to the corresponding rings. In order to retain the respective windings in position, the windings are preferably reinforced by continuous metal bands, as at 15a and 16a, tightly embracing the insulation covering of the respective windings.

The support for the primary or driving rotor P comprises a shaft 27 and the surrounding tubular hub portion 14' of the magnet element 14, the shaft having a pilot bearing 28 in one end of the coupling sleeve 10, and another bearing at 29, within the extreme rearward end of the hub 14', the rearward end of the shaft 27 being carried in a suitable bearing 30 in the machined central hub portion of the end plate 7 of the general housing. The shaft 27 obviously rotates freely with respect to the rotor unit P, as well as relative to the stationary housing. The forward end of the hub portion 14' of the magnet element 14 is adequately supported on the inner sleeve member of the coupling 10. Appropriate bearing (also oil) retainer members 31 and 32 are suitably secured to the members 7 and 14, respectively, adjacent respective bearings. Oil retainer packing recesses are also shown at 7' (on member 7) and 33 (on member 10). The rearwardly projecting end of the shaft 27 carries a driving flange 35 keyed on the shaft at 35' and secured at 37 for connection to the vehicle propeller shaft, e. g.

The secondary or driven rotor P' of the mechanism is attached to the shaft 27 between the bearings 29 and 30. This secondary rotor comprises a spider member 22 having a central hub 22' keyed to an enlarged portion of the shaft 27 and a circular rim or felloe portion 22'' embraced by and secured rigidly to a conductor ring 24 (copper e. g.) forming one of the circuit closing parts of a rotary "squirrel cage" including laminae 26 and conductor elements 25 in the nature of U bolts securing the laminae 26, the conductor ring 24 and a second conductor ring 24' together as a unit. The conductor elements of the squirrel cage are, of course, suitably insulated from the laminae. The outer portions of the laminae 26 are disposed in radial alignment with the stator cage laminae 3' and the inner laminae surfaces radially align with the pole portions 13a' and 14a. The inner surfaces are amplified by additional inner laminae of less radial extent than those which align with 3'.

The cooperative relationship between the brushes and collector rings is best shown in Figs. 5 and 6; Fig. 2, however, showing the alternate disposition of the rings forming the actual termini of the coils 15 and 16. Each set of brushes 46 (two in each set) cooperates with the alternate rings, one set for rings 17—17' and another set for 18—18'. Figs. 5 and 6 each shows the insulating casing of the brush assembly.

It will be noted that the brushes 46 of each set are mounted in common insulating casings 42, in turn secured to the casing 2 as by screws 47, the casings (see Fig. 6) having spaced parallel guideway bores for the brushes and the brushes being urged toward the respective collector rings by suitable zig-zag leaf spring conductor members 45, which also carry the current from the respective terminals 44 to the brushes. Suitable caps 43 support the terminals (binding posts)

and spring-conductors and close the interior of the brush casings.

Figs. 9 and 10 show the electrical connections between the respective windings 15 and 16 and the collector rings described, and also a suitable control arrangement electrically connected with the two sets of brushes, and a suitable source of power for controlling the apparatus. Fig. 9 shows an exemplary control setting and circuit relationships for forward speeds (from zero up to substantially engine speed) and Fig. 10 shows the controls and circuits established for reverse drive. The circuits will now be described.

In Figs. 9 and 10, 62 indicates a source of electric power, say the usual automobile battery. The lead 48 therefrom is connected, through the respective brush 46, with the collector ring 17. Tracing the circuit from the ring 17, lines 58 and 57 carry the current to and from the winding 15; 57 connecting with the ring 17'. The ring 17' connects, by line 50, with one terminal of a suitable controller, an arm portion 56 of which we will assume makes continuous contact with an arcuate conductor 54. The latter is permanently connected with a lead 51 and current flows from 51 to collector ring 18', thence through lead 60 to rotor winding 16, thence through line 59 to collector ring 18, thence through line 49 to a resistor or rheostat 53' and cooperating controller arm 55 and finally through line 52 back to the battery. This obviously places the coils 15 and 16 in series with the power source and the direction of current which flows through both is the same in the control setting described.

The control may be such that (as in Fig. 9) whenever the arm 55 is set for contact with the resistor points of 53', the arm 56 then makes continuous contact with the conductor 54, and (see Fig. 10) whenever the arm 55 makes contact with a similar resistor or rheostat 53 (connected with line 51) the arm 56 then makes continuous contact with a conductor 54' permanently connected with line 49. With such arrangement, and with the control arms shifted to the relative position just described (Fig. 10) the current flow in the primary rotor winding 16 is reversed relative to the flow in winding 15. This is the reverse drive condition (also used for braking) as will now be more fully explained in connection with the operation of the machine used as a variable speed power transmission on an automobile.

Operation: Assuming the engine is running and the control apparatus set as in Fig. 9 (for forward speed), the battery current circulating through the first primary rotor coil or winding 15 creates a magnetic flux or circuit including poles 12a, stator 3 and poles 13a. This generates an alternating current in the conductor bars 6 of the stator assembly, which in turn creates a magnetic flux in the stator 3' corresponding to that in 3. Simultaneously the current circulating in the other coil of the primary rotor (coil 16) creates a magnetic flux flowing through poles 14a, armature 26 and back to poles 13a'. Now since the rotor P' with its armature 26 has not been started in rotation, there will, upon initial turning of the rotor P, be relative rotation between the two rotors and this generates an alternating current in the conductor bars 25, which, in turn, creates a magnetic field in the armature laminae 26.

Now, due to the relative spacing of the poles of the different windings, 13a' for example being spaced 90 magnetic degrees from the nearest pole 12a (see Fig. 8) 14a the same number of degrees from the nearest pole 13a the field circuits created by the coils 15 and 16 as aforesaid react on the conductors of each other, that is to say, the magnetic flux in the stator 3' reacts on the conductors 25 of armature 26 and the flux generated in said armature reacts on the conductors 6 in the stator 3', causing motion of the armature in the same direction as that of the driving rotor. The degree of resistance of the armature to following the driving rotor depends upon the current generated and since the voltage depends on relative speed or slip between the armature and driving rotor, it follows that the greater the lag of the armature (i. e. the lower the speed of P') behind the speed of the driving rotor (P) the higher will be the torque of P' or shaft 27. The reverse is true for the same reasons, that is, the torque of P' diminishes as the speed of P' approaches that of P. Thus, torque delivery will be inversely proportional to speed delivery which is an ideal condition.

It will be seen that whenever the torque demand is greater than engine torque, as in starting the vehicle under adverse conditions, the field strength generated by current flow in the windings 15 and 16 may be decreased by means of the rheostat, whereupon the reaction between the respective generated fields of 15 and 16 is decreased and, due to a lower voltage being generated in the stator conductors 6, the armature 26 revolves at a slower speed, the driving rotor thus relatively increasing speed in the same proportion, (greater slip). This greater relative speed between the magnetic field generated by the winding 16 and the armature 26 generates a greater voltage in conductors 25, which in turn increases the intensity of resistance between the armature and the stator field at 3', increasing the torque capabilities of the propeller shaft.

Any desired forward speed, from zero up to approximately engine shaft speed, may be secured by varying the setting of the control arm 55 relative to the resistor 53'.

Reverse drive is accomplished as indicated in Fig. 10 by manipulating the rheostat to connect the arm 55 with resistor 53 directing the current from 54' to the coil 16 in a manner to reverse the field controlled by this coil, which, in turn, reverses the reactions between the stator and the armature 26. The actual reverse speed is governed by the control arm 55 acting on the variable resistance at 53. Braking is accomplished in the same manner as reverse drive and the braking force is controlled by varying the resistance at 53.

While the unit P' is shown as the driven member, it is to be understood that this is merely illustrative; and where the expressions "driving" and "driven" are used in the claims, these expressions signify a relative arrangement and are not by way of limitation.

I claim:

1. In a power transmission mechanism, a driving rotor adapted for connection to a rotary prime mover, a driven rotor adapted to be connected to an element to be driven, two sets of magnetic pole members on the driving rotor in spaced parallel transverse planes, means to electro-magnetically energize said pole members, an armature of the squirrel cage type mounted on said driven rotor and cooperatively magnetically associated with one of said sets of pole members, stationary reaction means including squirrel cage stator elements cooperatively associated with the other set of pole members to create magnetic flux therein, upon operation of the driving rotor, said armature being also subject to the flux of said stator for initial driving thereof upon starting of the machine.

2. In a power transmission mechanism, a driving rotor adapted to be connected to a prime mover, separate sets of circumferentially spaced magnetic pole elements carried by said driving rotor, said sets being axially offset from each other, means to energize said elements, a second rotor and an armature of the squirrel cage type carried by the second rotor and cooperatively associated with said magnetic pole elements of one set to generate current in the armature conductors, a stator of the squirrel cage type energized by the other set of pole elements, the magnetic forces thereby generated in the stator acting on the conductors of the armature to increase the torque of the armature as its speed decreases and the driving rotor speed increases.

3. In a power transmission mechanism, a driving rotor, a driven rotor, a plurality of discs on said driving rotor having circumferentially spaced pole elements arranged in two sets, the pole elements of each set being uniformly offset circumferentially with relation to the pole elements of the other set, a stator cooperating with one set of pole elements, an induction armature cooperatively arranged with respect to the stator so as to be driven thereby when the stator is energized, said armature being also cooperatively arranged with relation to said other set of pole elements, and means to simultaneously energize the pole elements.

4. In a power transmission mechanism, a driving rotor adapted for connection to a prime mover, a driven rotor, a composite magnetic element carried by said driving rotor and including thee members in axial alignment, having pole elements forming two sets of fields, windings for respective fields, settable control means to energize said windings for similar and relatively reverse current flow, the driven rotor having an armature of the squirrel cage type subject directly and indirectly, respectively, to the magnetic influence of said sets of pole elements, and driven thereby for forward and reverse speed relationships in accordance with the setting of said control means.

5. In a transmission of the class described, a driving rotor comprising three discs of magnetic material secured together in axial alignment, peripheral portions of said discs being circumferentially spaced to provide magnetic pole elements, each uniformly circumferentially spaced relative to all the other elements, the pole elements of the extreme discs lying in respective axially spaced transverse planes, and the pole elements of the intermediate disc being radially aligned with and positioned circumferentially between adjacent pole elements of respective extreme discs to form separate pole sets, windings respective to said sets located between adjacent discs, and means to concurrently energize said windings, a casing for said driving rotor, secondary induction rotor and stator elements supported by the casing and inductively related to said pole elements, the stator being energized by the pole elements of one set and the secondary rotor being disposed in inductive relationship with the stator and the remaining pole elements, for driving the induction rotor in the manner described.

FRANK A. JACKLITCH.